United States Patent
Dzik

(10) Patent No.: US 7,212,517 B2
(45) Date of Patent: May 1, 2007

(54) METHOD AND APPARATUS FOR JITTER AND FRAME ERASURE CORRECTION IN PACKETIZED VOICE COMMUNICATION SYSTEMS

(75) Inventor: Steven C. Dzik, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 914 days.

(21) Appl. No.: 09/829,314

(22) Filed: Apr. 9, 2001

(65) Prior Publication Data

US 2002/0145999 A1    Oct. 10, 2002

(51) Int. Cl.
*H04L 12/66* (2006.01)
*H04L 12/28* (2006.01)
(52) U.S. Cl. .................. 370/352; 370/356; 370/516; 370/521; 704/207
(58) Field of Classification Search .............. None
See application file for complete search history.

(56) References Cited

U.S. PATENT DOCUMENTS

| | | | | |
|---|---|---|---|---|
| 5,699,485 A | * | 12/1997 | Shoham | 704/223 |
| 5,825,771 A | * | 10/1998 | Cohen et al. | 370/394 |
| 5,890,108 A | * | 3/1999 | Yeldener | 704/208 |
| 6,167,060 A | * | 12/2000 | Vargo et al. | 370/468 |
| 6,356,545 B1 | * | 3/2002 | Vargo et al. | 370/355 |
| 6,389,032 B1 | * | 5/2002 | Cohen | 370/412 |
| 6,697,356 B1 | * | 2/2004 | Kretschmer et al. | 370/352 |
| 6,775,649 B1 | * | 8/2004 | DeMartin | 704/201 |
| 6,801,939 B1 | * | 10/2004 | Chafe | 709/224 |
| 2003/0016699 A1 | * | 1/2003 | McClary et al. | 370/474 |
| 2003/0112796 A1 | * | 6/2003 | Kwan | 370/352 |

* cited by examiner

*Primary Examiner*—Seema S. Rao
*Assistant Examiner*—Robert C. Scheibel, Jr.

(57) ABSTRACT

The invention comprises a system and method for correcting jitter and frame erasure in packet voice communication systems with out severely affecting the voice quality of the signal to be easily noticed by a listener. A packet is retrieved from a buffer, a pitch of the packet is determined, and the pitch of the packet is processed in a manner determinative of whether a next packet has arrived.

35 Claims, 6 Drawing Sheets

METHOD AND APPARATUS FOR JITTER AND FRAME ERASURE CORRECTION IN PACKETIZED VOICE COMMUNICATION SYSTEMS

BACKGROUND OF THE DISCLOSURE

1. Technical Field of the Invention

This invention generally relates to the field of communication systems and, more particularly, to a method and apparatus for correcting packet errors within a sequence of information bearing packets, such as jitter and frame erasure in packet voice communication systems.

2. Description of the Background Art

The conventional means of communicating between a calling and called party is to transmit voice signals from the subscriber to a serving central office as analog signals. Between the calling party's central office and the called party's central office, the voice signals are digitized. A T1 carrier is used between the calling party's central office and the called party's central office to communicate the digitized voice traffic using time division multiplexing (TDM). Each one of the 24 channels of the T1 is a 64 kb/s channel. However, the use of TDM is inefficient because 64 kb/s of silence is communicated as well as 64 kb/s of speech. In addition, when there is no caller on the line, a T1 channel is inefficiently utilized because no information is being communicated; yet the bandwidth of that channel is still being utilized.

The packetization of voice traffic provides an efficient means of communicating voice traffic because the bandwidth of a transmission medium is only utilized when traffic is being sent. However, there are problems with communicating voice as packetized traffic. The first problem is packet loss, which is also known as frame erasure. Packet loss occurs when a packet does not arrive or arrives to late to be used and is therefore discarded. A second problem is jitter, which occurs because packets have different transit times. Packet loss and jitter can result in a low quality audio signal.

A typical technique to resolve packet jitter and reduce loss is to store the arriving packets in buffers until substantially all of the packets arrive. For instance, if the average time needed for a packet to get across a network is 50 ms, but the slowest 1% of the packets take more than 200 ms, then the delay is set to 200 ms so that 99% of the packets will arrive in time to be played. The other 1% of the packets will be discarded when they arrive. The delay is accomplished by storing the packets that arrived within 200 ms in a "jitter buffer", a first in first out (FIFO) queue where the packets are kept before playout. Since all packets must be delayed to accommodate the slowest packets, most of the packets spend a great deal of time waiting in the jitter buffer to be played. The total latency is the difference between the transmission time of the packets and the play out time, which is approximately equal to the maximum time between transmission and receive times.

However, such techniques to handle jitter and frame erasure do not work well above packet losses of 10% because the human ear is sensitive to delays and/or noise in speech. For instance, when a telephone user is talking to another party delays and/or noise can prove to be irritating to both parties. The speech signal may meet the required quality measurements, but the telephone user on a call can still detect delays in speech and noise.

SUMMARY OF THE INVENTION

The invention comprises a method and apparatus for creating a continuous stream from packetized voice traffic in a manner tending to avoid long delays, which are typically discernable to listeners. The invention advantageously provides enhanced Quality of Service (QoS) by opportunistically avoiding signal degradation.

A method of processing a sequence of audio samples, each of said samples being stored within a respective packet, said method comprising retrieving a packet from an input buffer, determining at least one parameter of audio information contained within said packet, and adapting the determined parameter to provide an appropriate parameter transition to audio information within a nonsequentially following packet.

An apparatus comprising a first VoIP gateway for retrieving a packet from an input buffer, said first VoIP gateway determining at least one parameter of audio information contained within said packet, said first VoIP gateway adapting the determined parameter to provide an appropriate parameter transition to audio information within a nonsequentially following packet.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, wherever possible, to designate identical elements that are common to the figures.

DETAILED DESCRIPTION OF THE INVENTION

The invention will be described within the context of a pair of subscribers (A and B) communicating via a communications network. It should be noted that although the present invention is depicted as being used in a Voice over Internet Protocol (VoIP) gateway, the invention should not be limited to VoIP gateways, rather the present invention can be practiced in any apparatus in which packetized voice traffic has to be converted into a stream. It should also be noted that any voice or audio bearing packets may be advantageously processed according to the invention.

In one embodiment, the invention operates to determine one or more parameter associated with audio information within perspective packets in a sequence of packets, and adapt the parameter of a packet, in a manner tending to provide a smooth transition to audio information within a following nonsequential packet.

In another embodiment of the invention, a packet play time is adjusted to accommodate the arrival of the next packet, which can include a sequential or nonsequential following packet.

Figure 1:
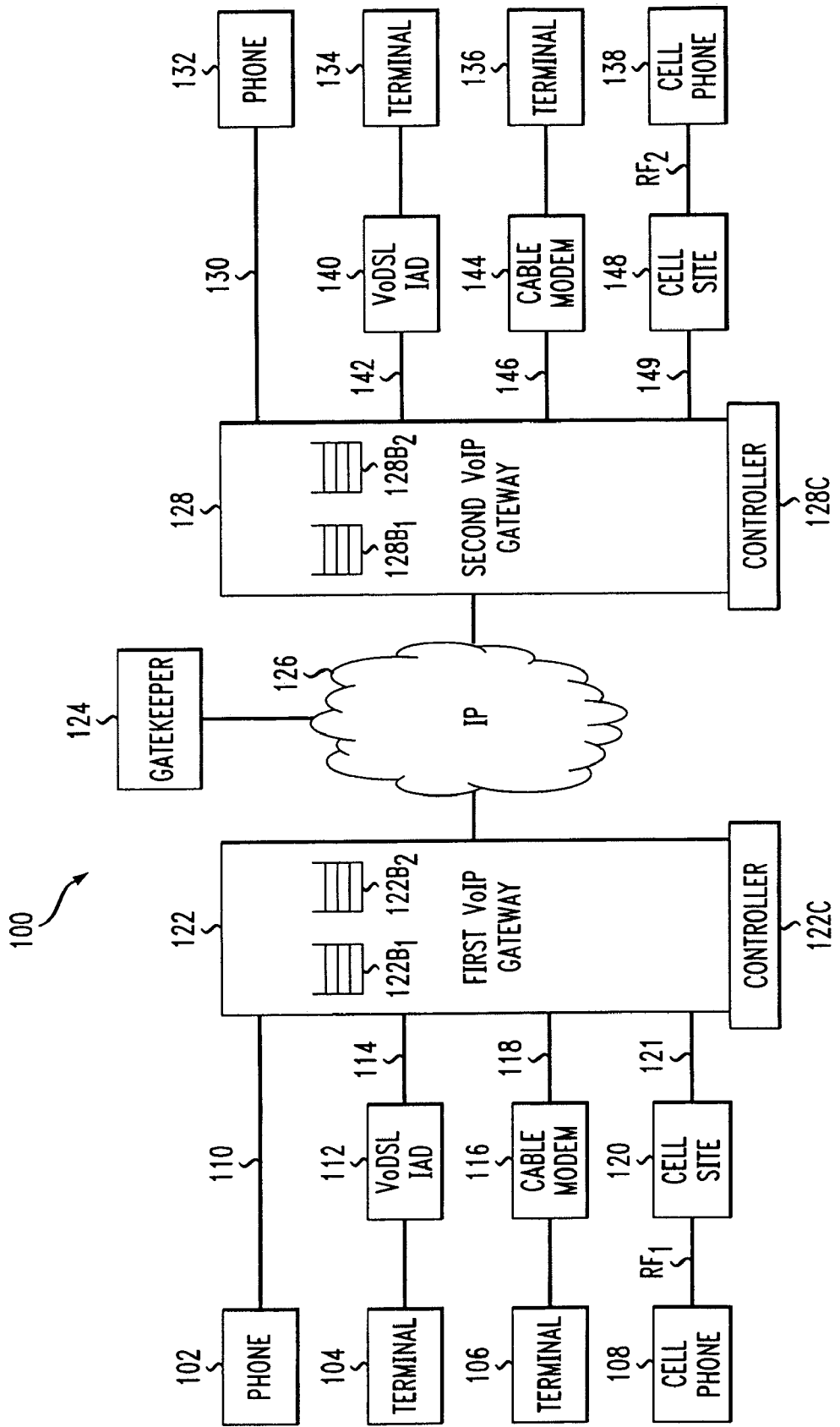
FIG. 1 depicts a high level block diagram of a communications system including the present invention.

FIG. 1 depicts a high level block diagram of a communications system including the present invention. Specifically, the system 100 of FIG. 1 comprises a first VoIP gateway 122 having a VoIP controller 122C, a first plurality of input buffers $122B_1$ and a first plurality of output buffers $122B_2$. The first VoIP gateway 122 is coupled to a telephone 102 via a transmission medium 110 (illustratively, a copper pair, coaxial cable, fiber optic cable or the like), a first Voice over Digital Subscriber Service Line (VoDSL) Integrated Access Device (IAD) 112 via a transmission medium 114, a cable modem 116 via a transmission medium 118, and a first cellular telephone site 120 via a transmission medium 121. First VoDSL IAD 112 is in turn coupled to a terminal 104 (illustratively, a telephone, a Personal Computer (PC) or workstation). A terminal 106 is coupled to cable modem 116. A cellular telephone 108 is coupled to first cellular telephone site 120 via a radio frequency ($RF_1$) link.

It should be noted that the present invention does not require a specific DSL service type, such as Asymmetric Digital Subscriber Line (ADSL), Rate Adaptive DSL (RADSL), Single-line DSL (SDSL), Integrated Services Digital Network (IDSL) and the like. Therefore, those skilled in the art and informed by the teachings of the present invention will be able to readily adapt any appropriate DSL service type to the present invention.

The first VoIP gateway 122 is coupled to an Internet Protocol (IP) network 126. Also coupled to IP network 126 is a second VoIP gateway 128 having a VoIP controller 128C, a second plurality of input buffers $128B_1$ and a second plurality of output buffers $128B_2$. Optionally, a gatekeeper 124 is coupled to IP network 126. The gatekeeper has a database (not shown) for storing IP addresses which correspond to telephone numbers.

Second VoIP gateway 128 is coupled to a telephone 132 via a transmission medium 130, a second Voice over Digital Subscriber Service Line (VoDSL) Integrated Access Device (IAD) 140 via a transmission medium 142, a second cable modem 144 via a transmission medium 146, and a second cellular site 148 via a transmission medium 149. Second VoDSL IAD 140 is in turn coupled to a terminal 134. In addition, a terminal 136 is coupled to second cable modem 144, and cellular phone 138 is coupled to second cellular site 148 via a radio frequency ($RF_2$) link.

It should be noted that the operation of the first VoIP gateway 122 is similar to the operation of the second VoIP gateway 128. As such, only differences between the first VoIP gateway 122 and second VoIP gateway will be described in more detail. It should also be noted that only some (or all) of the communication devices coupled together first and/or second VoIP getways may be used. Further, there is no requirement that the gateways communicate with similar devices, such as those depicted in FIG. 1.

When a caller (i.e., calling party) goes "off hook" and dials the phone number of a called party, the call is established in a conventional manner, wherein the phone number of the called party is converted to an IP address and a signaling path is established. When the called party answers the phone, a "talk path" is established between the calling and called party.

Assuming a calling party is served by first VoIP gateway 122, voice traffic is digitized at the calling party's phone, VoDSL IAD 112 or cable modem 116. At the first VoIP gateway 122, the digital stream is packetized and transported over the IP network using the Real-time Transport Protocol (RTP) data structure. It will be appreciated by those skilled in the art that other types of data structures can be used that still fall within the scope of the invention.

Each voice packet, which will be described more fully below with respect to FIGS. 2A–2D, may take a different amount of time to traverse IP network 126 and reach VoIP gateway 128. Some of the voice packets may arrive late; some voice packet may arrive so late that subsequent packets have already arrived. As voice packets arrive, the voice packets are stored in the second plurality of input buffers $128B_1$. The incoming voice packets are stored sequentially in the order of transmission rather than in the order of arrival. A packet at the head of the second plurality of input buffers is retrieved from the second plurality of input buffers $128B_1$ to be processed by the VoIP controller 128C.

The VoIP controller 128C applies time scaling techniques to the retrieved voice packet while waiting for the next voice packet to arrive. Time scaling allows the current packet to be expanded or reduced without affecting the spectral qualities of the speech contained in the voice packet. Using this technique, packets can be expanded to handle missing, out of sequenced and/or delayed voice packets and subsequently to correct for short delays that may need to be introduced. A voice stream is produced wherein expansions or reductions due to processing each individual packet are not easy to detect for the listener. It is noted that the scaling effects the pitch of the audio information within the voice packet.

The present invention is applied in the network where voice packets are converted into a continuous stream and can accommodate any type of voice coder. In addition, no special information from the transmitting end, VoIP gateway 122 is required.

It should be appreciated by those skilled in the art that although the invention is described in the context of a call being established in one direction, the call can be established in either direction and communication between the respective gateways 122 and 128 can occur simultaneously according to the present invention. Moreover, any communication devices may be supported.

Figure 2A:
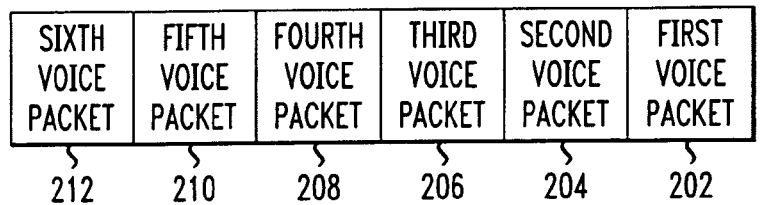
FIGS. 2A through 2D comprise graphical representations of time scaling according to the present invention and suitable for application to voice packets processed by the communications system of FIG. 1.

FIGS. 2A to 2D together depict time scaling, according to the present invention, being applied to voice packets used in the communications system of FIG. 1. Specifically, FIG. 2A depicts a voice packet stream 200 having a first voice packet 202, a second voice packet 204, a third voice packet 206, a fourth voice packet 208, a fifth voice packet 210 and a sixth voice packet 212. The voice packet stream 200 a digitized and packetized version of an analog voice signal produced at VoIP 122 or at some other location (i.e. at VoDSL IAD 112, cable modem 116, etc.). Although each of the voice-bearing packets are contiguous in the voice packet stream 200, each of the packets comprising voice stream packet 200 can take a different route via IP network 126 to reach VoIP gateway 128. Therefore, each packet can take different amounts of time to go through the network. Thus, upon arrival at VoIP gateway 128, the individual packets that comprise voice stream 200 can arrive late, out of sequence and/or not at all.

Figure 2B:
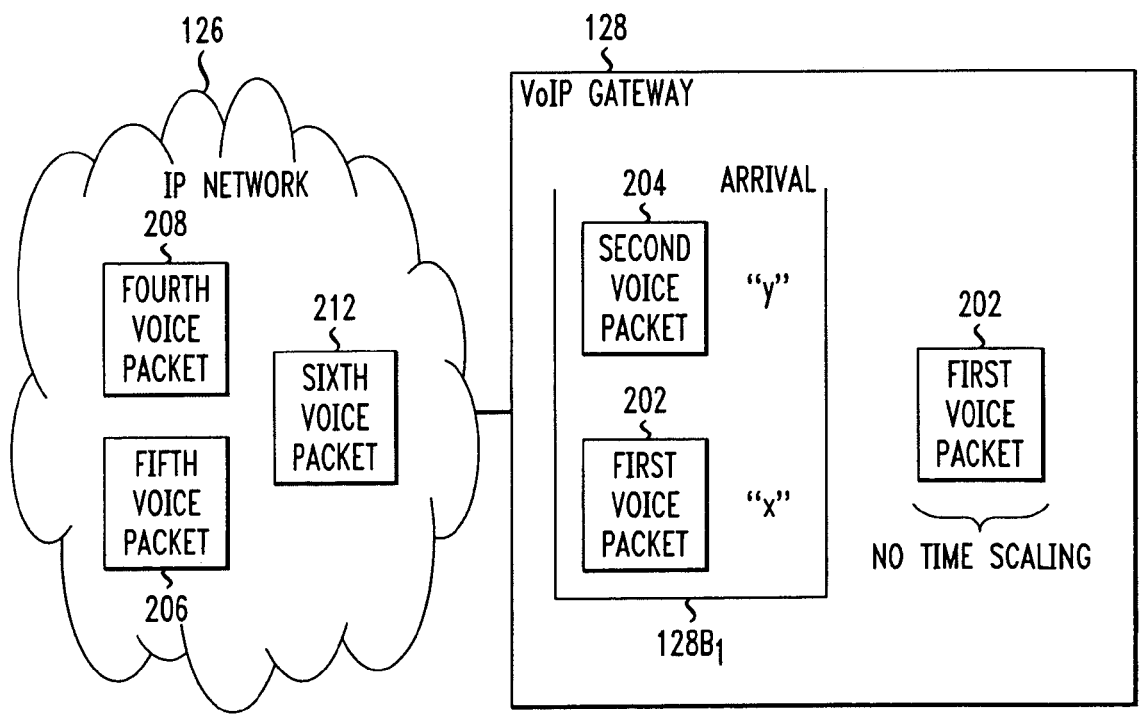

FIG. 2B depicts an example of a first group of packets being stored in the second plurality of input buffers $128B_1$ while a second group of packets are also in transit to the second plurality of input buffers $128B_1$ via the IP network 126. Specifically, FIG. 2B depicts second voice packet 204 having an arrival time of "X" and first voice packet 202 having a later time of arrival of "Y", where the time difference between "X" and "Y" is in milliseconds. Both first voice packet 202 and second voice packet 204 are stored in the second plurality of input buffers $128B_1$. Third voice packet 206, fourth voice packet 208 and sixth voice packet 212 are in transit via IP network 126 to second plurality of input buffers 128B₁. According to an aspect of the invention, the packets are sorted by sequence number. When packets arrive out of sequence, the packet arrival times are switched, so that the packet arrival times are also in order. For instance, first voice packet 202 will now have an arrival time of "X", and second voice packet 204 will have an arrival time of "Y". As mentioned previously, first voice packet 202 will be processed first and then second voice packet 204.

FIG. 2B depicts time scaling on a voice packet when the next packet is waiting in the buffer. Specifically, FIG. 2B depicts first voice packet 202 being processed according to one aspect of the invention. More specifically, second VoIP gateway 128 detects that second voice packet 204 is presently waiting in the second plurality of input buffers 128B₁. Therefore, no time scaling needs to be performed on first voice packet 202. Second VoIP gateway 128 processes first voice packet 202 in a conventional manner and retrieves second voice packet 204.

Figure 2C:
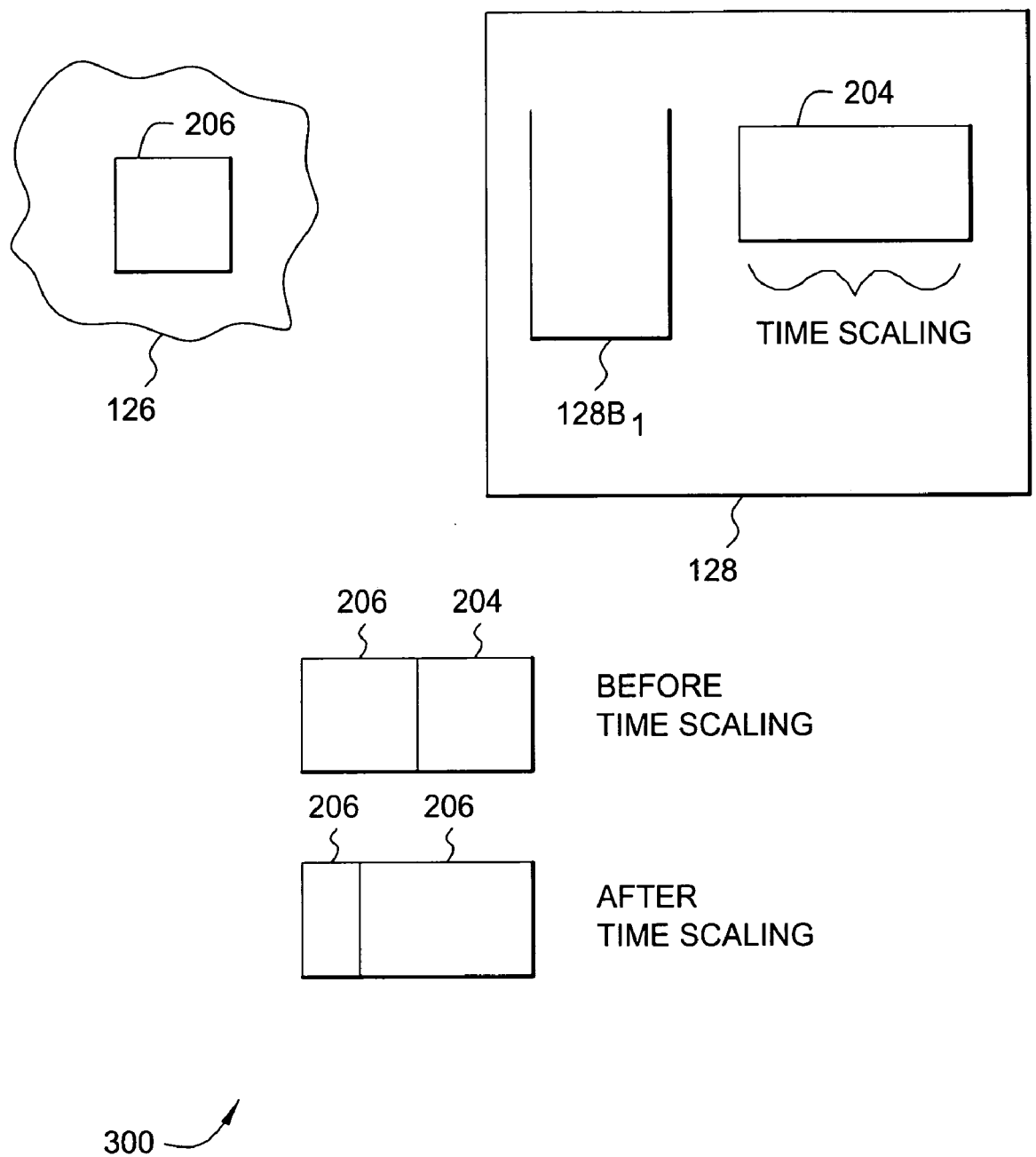

FIG. 2C depicts time scaling being performed on a voice packet while the next packet is in transit. Specifically, FIG. 2C depicts second voice packet 204 being time scaled according to an embodiment of the invention while third voice packet 206 is in transit. Second VoIP gateway controller 128C determines that third voice packet 206 has not arrived but second voice packet 204 is ready for processing. A determination is made as to how long it will take to actually play out the current retrieved packet, second voice packet 204. This time is defined as the actual play time (APT). A determination is made as to how long it will take for the next packet, third voice packet 206, to arrive. This time is defined as estimated time of arrival (ETA). A second determination is also made as to the estimated play time of the next packet, third voice packet 206. This time is defined as the estimated time of arrival of the third voice packet 206 plus a latency (L) period, where ETA+L=Target Play time of the next packet (TPT). The latency period is currently set to one packet length, which is 20 msec. However, it will be appreciated by those skilled in the art that the delay can be varied and still fall within the scope of the present invention.

Since third voice packet 206 has illustratively not arrived, time scaling will be implemented on second voice packet 204. Second voice packet 204 will be "expanded" to compensate for the delay in third voice packet's 206 arrival. Specifically, the pitch of the fundamental frequency of the voice conveyed by this product will be reduced or expanded in a manner that tends to avoid perceptually changing the pitch or perceived tonal quality of the voice or speech. More specifically, since speech waveforms are mostly periodic, pitch periods can be synthesized from two neighboring periods, rather than being directly inserted or removed.

To expand speech, a new period is synthesized and inserted between the two adjacent periods. To shrink, a new period replaces the two adjacent periods. The synthesized period is constructed to provide a smooth transition from the original speech signal. Specifically, in one embodiment, two adjacent periods are blended together using a weighted average of one. The weights are assigned so that the synthetic signal transitions out of and into the original signal. The Overlap/Add method will be discussed in more detail below with respect to FIG. 4.

Alternatively, if third voice packet 206 arrives sooner than expected, time scaling can be used to reduce the processing of the third voice packet 206 if fourth voice packet 208 is waiting in the buffer. The pitch of third voice packet 206 will be determined and a pitch period will be removed from third voice packet 206 in order to start processing the fourth voice packet 208 as soon as possible. In this manner the overall time to process packets remains the same because packet play times are extended where a packet is late or lost and the next packet play time can be reduced to compensate for the long play time of the previous packet.

Second VoIP gateway controller 128C detects the pitch of second voice packet 204. Illustratively, there is a 160 sample auto-correlation window which slide from 20 to 120 samples apart. The pitch is the separation with the maximum auto-correlation. Altogether 280 contiguous samples are used in this example. When the sample size is less than 280 packets (or about 35 msec of voice data) and packets are lost, there may not be 280 previous samples. To compensate for this, second VoIP gateway controller 128C optionally examines the entire "packet neighborhood" around the current sample and tries to identify a 280 sample neighborhood. If a neighborhood is not identified, then second VoIP gateway controller 128C will determine how many samples are available and try to fit an appropriate the window length. As a last resort, the period range is adjusted according to the actual or useful available sample neighborhood.

The scaling factor can be altered dynamically so that speech packets can be treated as packets that can be expanded or reduced as needed. Time scaling is used continuously to compensate for jitter and frame loss. Packets are expanded and/or reduced as needed to keep a continuous stream of voice playing with a minimum of delay. A voice packet can be expanded by an integral amount of pitch periods. For instance, if a pitch period is 20 ms then packets can only be expanded by increments of 20 samples i.e., 20, 40, 60, 80 samples. This effect is substantially imperceptible to the listener because the temporal distortions occur for very short periods of time and are quickly compensated. For instance, if each voice packet is 20 msec and second voice packet 204 is expanded to 40 msec and third voice packet 206 and fourth voice packet 208 are each shrunken to 10 msec, the total time for the 60 msec of speech is the same and the listener will not notice the change. However, voice packets can not be shrunk by more than a factor of approximately two because you are combining two periods into one. Reducing a packet by a factor greater than two, can not be done without causing an increase in user perception of the temporal distortion.

Figure 2D:
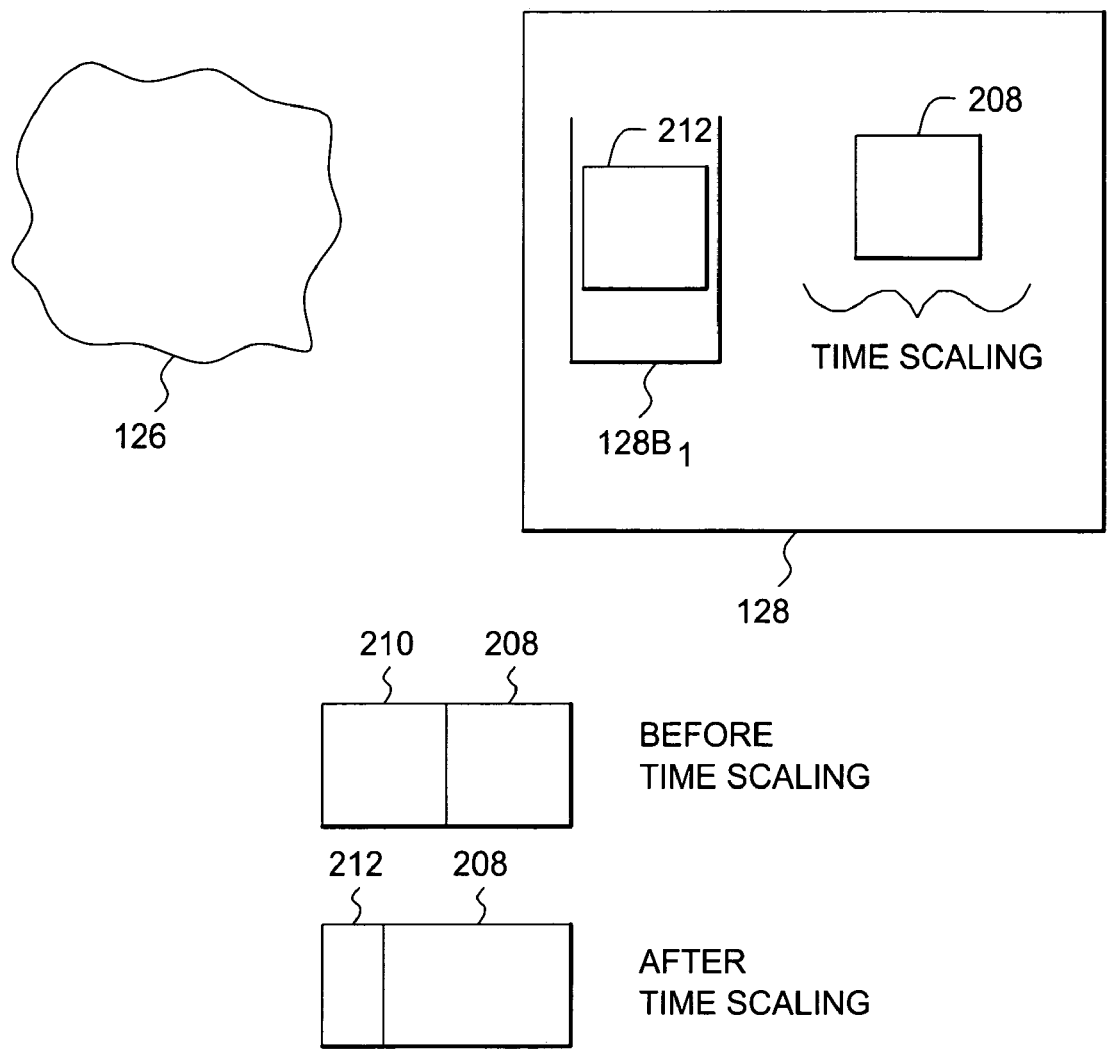

FIG. 2D depicts time scaling being performed on a voice packet when the next packet is lost. Specifically, fourth voice packet 208 is being processed. More specifically, fourth voice packet 208 will be expanded until the target play time (TPT) of fifth voice packet 210 arrives. If the fifth voice packet 210 has not arrived by this TPT, the next consecutive packet, sixth voice packet 212, will be joined with fourth voice packet 208. Sixth voice packet 210 will be reduced so that the original total play time of the two packets (20 msec+20 msec) will remain the same. That is, if fourth voice packet 208 was expanded to 30 msec, sixth voice packet 212 will be shrunk to 10 msec. This way the overall total play time remains the same. The adjacent periods of the fourth voice packet 208 and sixth voice packet 212 will be joined by blending adjacent periods of the two packets so that there is no phase difference between the two packets. For instance, if fourth voice packet 208 was expanded and the period ended at a peak, sixth voice packet 212 should begin at a peak also, to synthesize the two packets smoothly. If sixth packet arrived and began at a trough, periods or portions of a period will be added so that sixth voice packet 212 will begin at a peak. If fifth voice packet 210 should appear after the processing of sixth voice packet 212, it will be discarded.

Figure 3:
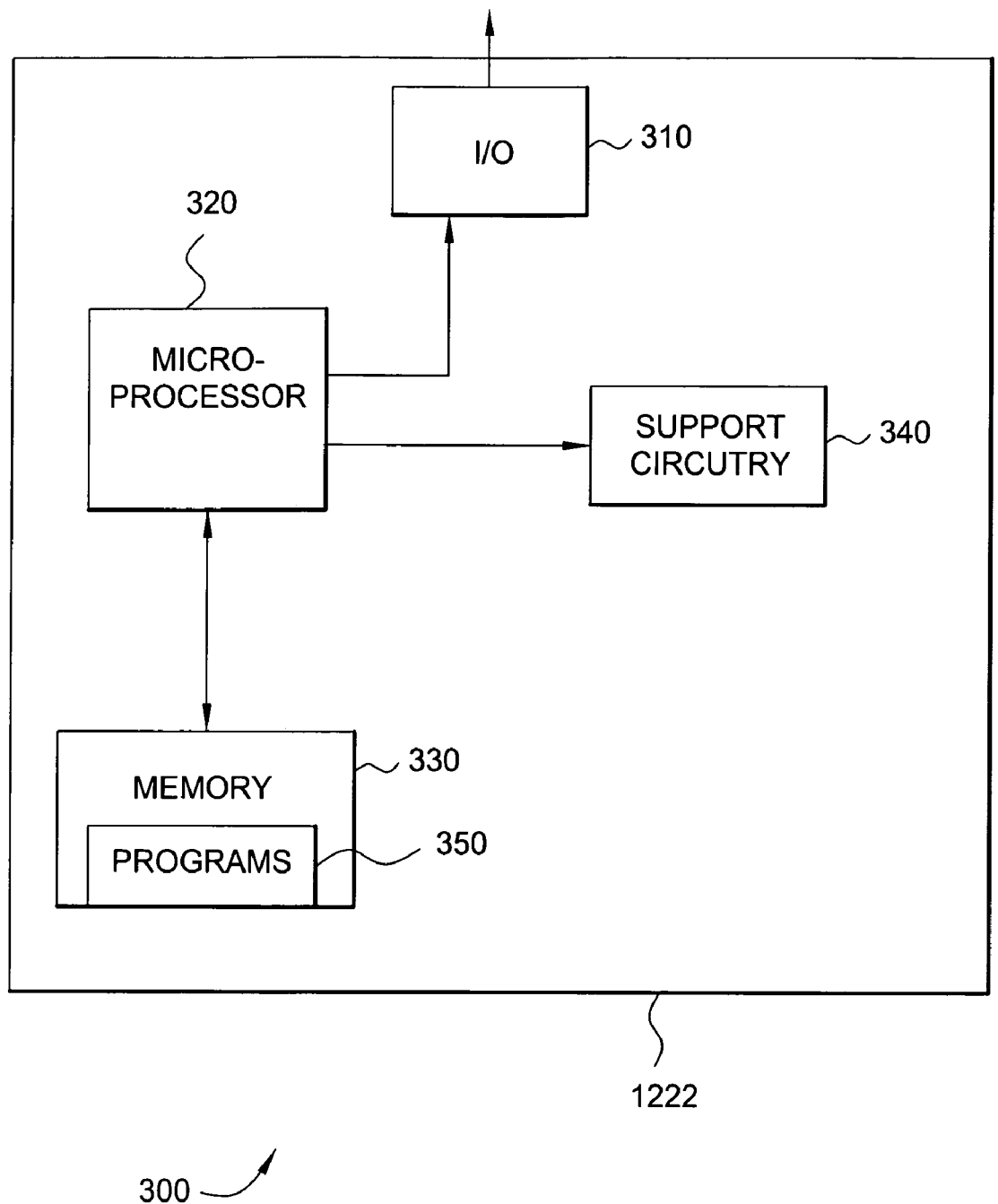
FIG. 3 depicts a high level block diagram of an embodiment of a controller suitable for use within a Voice over Internet Protocol (VoIP) gateway.

FIG. 3 depicts a high level block diagram of an embodiment of the optional controller 122C suitable for use within a VoIP gateway. Specifically, FIG. 3 depicts a high level block diagram of a VoIP gateway controller 122C suitable for use in VoIP gateway 122 of the communication system 100 of FIG. 1. The VoIP gateway controller 122C comprises a microprocessor 320 as well as memory 330 which has a program storage portion 350 for storing the time scaling method 400. The microprocessor 320 cooperates with conventional support circuitry 340 such as power supplies, clock circuits, cache memory and the like as well as circuits that assist in executing the software methods of the present invention.

The VoIP gateway controller 122C also comprises input/output circuitry (I/O) 310 that forms an interface between the microprocessor 320, the DSLAM 130, the IP network 126 and other VoIP circuitry (not shown).

Although the VoIP controller 122C is depicted as a general purpose computer that is programmed to perform VoIP control and processing functions in accordance with the present invention, the invention can be implemented in hardware, in software, or a combination of hardware and software. As such, the processing steps described above with respect to the various figures are intended to be broadly interpreted as being equivalently performed by software, hardware, or a combination thereof. It will be appreciated by those skilled in the art that the VoIP controller 122C provides sufficient computing functionality to implement the invention as described above.

Figure 4:
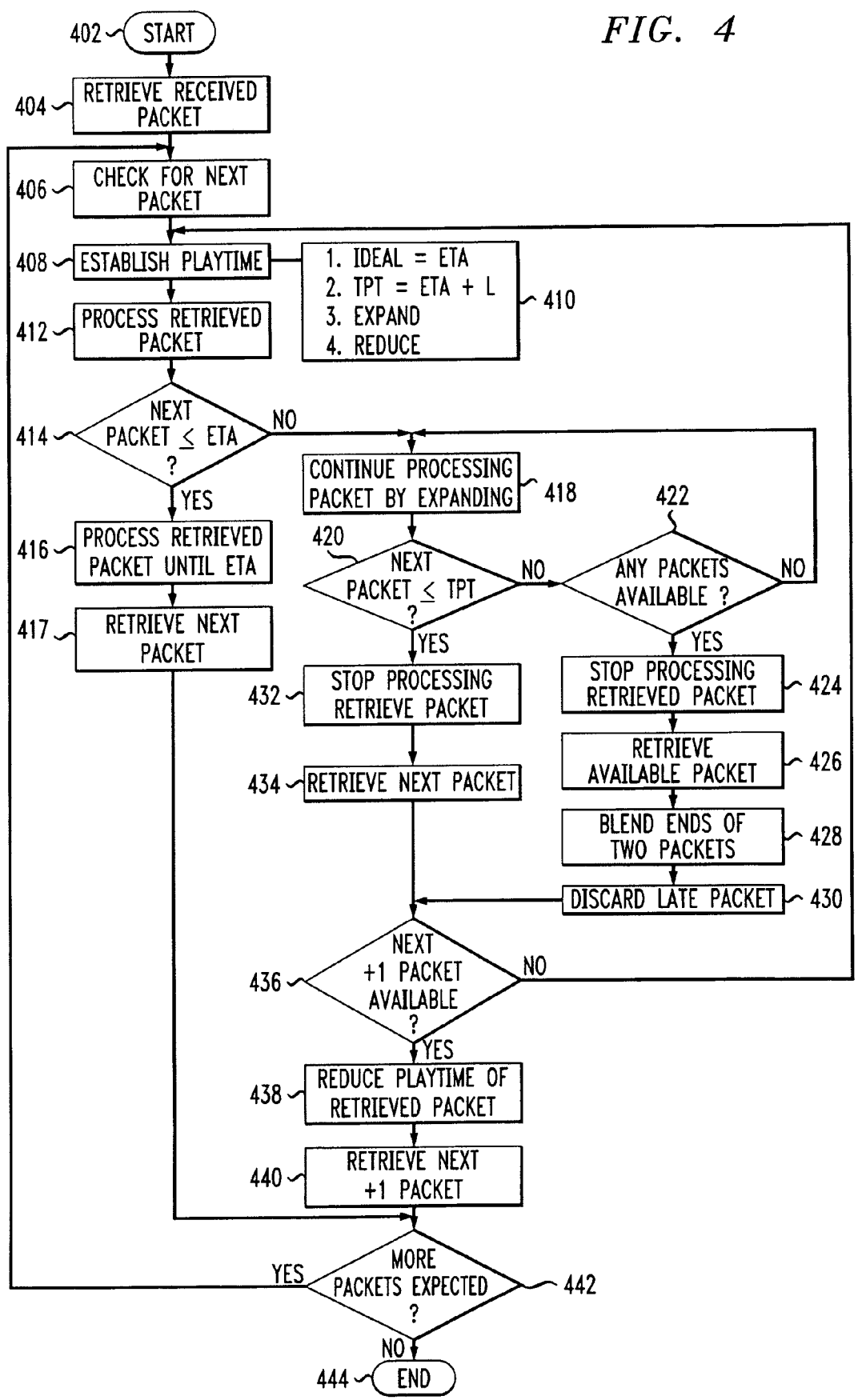
FIG. 4 depicts a call flow diagram useful in understanding an embodiment of the present invention.

FIG. 4 depicts a flow diagram of a method according to an embodiment of the present invention. The method 400 of FIG. 4 may be stored in the VoIP controller 122C in, for example, memory 330 within the portion used for storage of various programs 350. Specifically, method 400 depicts a method for time scaling individual voice packets to accommodate for jitter and packet loss.

The method 400 is initiated at step 402 and proceeds to step 404, where a packet is retrieved from the buffer. It is assumed that the packet retrieved is a sequential packet that is first or next to be processed. The method 400 then proceeds to step 406 where a check is made as to the availability of the next consecutive packet.

At step 408 a play time is established for the retrieved packet. That is, at step 410, four conditions can occur. First, an ideal condition can occur where the play time of the retrieved packet will be equal to the estimated time of arrival (ETA) of the next consecutive packet. For illustrative purposes, the ETA is assumed to be 20 ms.

Secondly, a condition can occur where the target play time (TPT) of the retrieved packet is equal to or less than the ETA of the next consecutive packet plus a latency. The latency is about 20 ms, but it will be appreciated by those skilled in the art that the latency can be greater or less than 20 ms.

Thirdly, a condition can occur where the play time may have to be expanded. For instance, expansion can occur where the next packet has not arrived within the ETA. To accommodate the delay in the arrival of the next packet, the play time of the next packet will have to be expanded. That is, periods within the retrieved packet will be copied. By expanding the play time of the retrieved packet, the next packet is given more time to arrive.

Fourthly, a condition may occur where the play time of the next available packet will have to be shortened. Specifically, this will occur where the play time of the previous packet had to be expanded. To compensate for the additional play time, the play time of the next packet has to be shortened so that the overall play time of a plurality of packets remains about the same. The method 400 then proceeds to step 412.

At step 412 the retrieved packet is processed. That is the packet is played based on the established play time from the previous step. The method 400 then proceeds to step 414.

At step 414 a query is made as to whether the next packet has arrived within its ETA. If the query at step 414 is answered affirmatively, the method 400 proceeds to step 416. If the query at step 414, is answered negatively, the method then proceeds to step to step 418

At step 418 the received packet is continued to be processed by expanding the play time of the received packet. That is, audio information within the packet is determined. Specifically, the pitch of the speech is determined for the audio bearing information bearing packet. More specifically, the period contained within the packet is copied. There is no limit to how many times a period can be copied for a packet. By copying the period of the packet, it gives the next packet time to arrive. The method 400 then proceeds to step 420.

At step 420 a query is made as to whether the next packet has arrived within the TPT. Since the next packet did not arrive within its ETA, it is assumed the next packet is now into the latency period. If the query at step 420 is answered negatively, the method proceeds to step 422. If the method at step 420 is answered affirmatively, the method then proceeds to step 432.

At step 432 the processing of the retrieved packet is stopped. Now that the next packet has arrived, it is no longer necessary to continue the processing of the retrieved packet. The method 400 then proceeds to step 434.

At step 434 the next packet is retrieved from the buffer. That is, the next packet now becomes a retrieved packet. The method 400 then proceeds to step 436.

At step 436 a query is made as to whether the next +1 packet is available. If the query at step 436 is answered negatively, the method proceeds to step 408. If the query at step 436 is answered affirmatively, the method 400 then proceeds to step 438.

At step 438 the play time of the retrieved packet is scaled. Since the previous packet was expanded, the retrieved packet can now be reduced since the next +1 packet is waiting in the buffer. Specifically, the pitch of the retrieved packet is determined, and a period contained within the retrieved packet is deleted. Although periods can be added indefinitely, periods can only be deleted by a factor of two. A listener would be able to discern more than one missing consecutive period. The method 400 then proceeds to step 440 where the next +1 packet is retrieved from the buffer.

At step 442 a query is made as to whether more packets are expected. If the query at step 442 is answered negatively the method 400 comes to an end at step 444. If the query at step 442 is answered affirmatively, the method 400 then proceeds to step 406.

At step 416 the retrieved packet is processed until the end of the ETA of next packet. No scaling needs to be done to the retrieved packet since the next packet has arrived early. The method 400 then proceeds to step 417.

At step 417 the next packet is retrieved and subsequently becomes a retrieved packet. The method 400 then proceeds to step 442.

At step 422 a query is made as to whether any packets are available in the buffer. If the query at step 422 is answered negatively, the method then proceeds to step 418. If the query at step 422 is answered affirmatively, the method then proceeds to step 424.

At step 424 the processing of the retrieved packet is stopped. That is the retrieved packet is no longer played. The method 400 then proceeds to step 426.

At step 426 the next available consecutive packet is retrieved. For instance, if first voice packet 302 was processed and second voice packet 304 did not show up within the TPT but third voice packet 306 and fourth voice packet 308 were available in the buffer, third voice packet 306 would be selected since it would be the next consecutive packet after the missing packet.

Since the packets are not contiguous, blending will have to be done to synthesize the two packets so that the playing of the previous packet and the available packet transitions smoothly. The missing packet would have blended with the previously processed packet since the previous packet was consecutive and contiguous with the previous packet i.e., first voice packet 302 and second voice packet 304.

That is since voice is no more than sine waves. When the processing ended on the previous packet, the processing terminated at some point on that sine wave i.e. the peak of that wave. In order to blend the next available packet, the sine wave of the next available packet should begin exactly where the previous packet ended. Listeners are susceptible to discrepancies in sound. A new period will be created so that the next available wave begins where the previous wave ended. The method 400 then proceeds to step 430.

At step 430 the late packet is discarded when it arrives. The method 400 then proceeds to step 436.

The present invention provides a method and apparatus to improve the quality of packetized voice through the use of time scaling to compensate for distortions created by jitter and packet loss. Voice quality is improved while total delay is reduced. Because the present invention operates on the receiving end of a communications system, the invention can be practiced in multi-vendor environments.

Although various embodiments which incorporate the teachings of the present invention have been shown and described in detail herein, those skilled in the art can readily devise many other varied embodiments that still incorporate these teachings.

What is claimed is:

1. A method of processing a sequence of audio samples, each of said samples being stored within a respective packet, said method comprising:
   retrieving a first packet from an input buffer, said first packet having an associated length;
   determining pitch associated with audio information contained within said first packet;
   determining whether a second packet of said audio samples has arrived at said input buffer, said second packet having an expected arrival time and an associated length;
   in response to a determination that the second packet arrives after the expected arrival time, adjusting said length of said first packet using at least one pitch period associated with said pitch; and
   adjusting the length of the second packet, using at least one pitch period associated with a pitch of the second packet, according to the adjusted length of the first packet and an arrival time of a third packet received after the second packet.

2. The method of claim 1, wherein said adjusting said length of said first packet comprises:
   processing at least two adjacent pitch periods to produce a new pitch period.

3. The method of claim 2, wherein said new pitch period replaces said at least two adjacent pitch periods.

4. The method of claim 2, wherein said new pitch period is inserted between two of said at least two adjacent pitch periods.

5. The method of claim 1 further comprising:
   determining the length of the second packet.

6. The method of claim 1, further comprising:
   determining an estimated time of arrival (ETA) of the third packet.

7. The method of claim 6, wherein a target play time comprises the ETA and a latency period of the third packet.

8. The method of claim 5, wherein the length of the second packet is reduced in response to a timely arrival of the third packet at said input buffer.

9. The method of claim 8, wherein the length of the second packet is not reduced by a factor greater than two.

10. The method of claim 9, wherein the length of the second packet is reduced by deleting at least one pitch period of a plurality of pitch periods contained within audio information of the second packet.

11. The method of claim 7, wherein the length of the second packet is expanded if the third packet arrives during the latency period associated with the third packet.

12. The method of claim 1, wherein the length of the second packet is adjusted to compensate for adjustments of the length of the first packet.

13. An apparatus comprising:
   a first VoIP gateway for retrieving a first packet from an input buffer, said first packet having an associated length;
   said first VoIP gateway determining pitch associated with audio information contained within said first packet;
   said first VoIP gateway determining whether a second packet of said audio information has arrived at said input buffer, said second packet having an expected arrival time and an associated length
   said first VoIP gateway adjusting said length of said first packet using at least one pitch period associated with said pitch, responsive to a determination that said second packet arrives after the expected arrival time;
   said first VoIP gateway adjusting the length of the second packet, using at least one pitch period associated with a pitch of the second packet, according to the adjusted length of the first packet and an arrival time of a third packet received after the second packet.

14. The apparatus of claim 13, wherein said adjusting said length of said first packet comprises:
   processing at least two adjacent pitch periods to produce a new pitch period.

15. The apparatus of claim 14, wherein said new pitch period replaces said at least two adjacent pitch periods.

16. The apparatus of claim 15, wherein said new pitch period is inserted between two of said at least two adjacent pitch periods.

17. A method of claim 13, wherein said first VoIP gateway determines the length of the second packet.

18. The apparatus of claim 13, wherein said first VoIP gateway determines an estimated time of arrival (ETA) of the third packet.

19. The apparatus of claim 18, wherein a target play time comprises the ETA and a latency period of the third packet.

20. The apparatus of claim 17, wherein the length of the second packet is reduced in response to a timely arrival of the third packet at said input buffer.

21. The apparatus of claim 20, wherein the length of the second packet is not reduced by a factor greater than two.

22. The apparatus of claim 21, wherein the length of the second packet is reduced by deleting at least one pitch period of a plurality of pitch periods contained within audio information of the second packet.

23. The apparatus of claim 19, wherein the length of the second packet is expanded if the third packet arrives during the latency period of the third packet.

24. The apparatus of claim 23, wherein the length of the second packet is expanded by copying pitch periods contained within audio information of said second packet.

25. An apparatus for expanding and reducing audio information within packets, comprising:
   a processor; and
   a storage device coupled to said processor for controlling said processor, said processor comprising instructions operative to:
   retrieve a first packet from an input buffer, said first packet having an associated length;
   determine pitch associated with audio information contained within said first packet;
   determine whether a second packet of said audio information has arrived at said input butter, said second packet having an expected arrival time and an associated length;
   in response to a determination that the second packet arrives after the expected arrival time, adjust said length of said first packet using at least one pitch period associated with said pitch; and
   adjust the length of the second packet, using at least one pitch period associated with a pitch of the second packet, according to the adjusted length of the first packet and an arrival time of a third packet received after the second packet.

26. A computer readable medium having stored thereon a plurality of instructions including instructions which, when executed by a processor, ensures the processor to perform a method comprising:
   retrieving a first packet from an input buffer, said first packet having an associated length;
   determining pitch associated with audio information contained within said first packet;
   determining whether a second packet of said audio information has arrived at said input buffer, said second packet having an expected arrival time and an associated length; and
   in response to a determination that the second packet arrives after the expected arrival time, adjusting said length of said first packet using at least one pitch period associated with said pitch; and
   adjusting the length of the second packet, using at least one pitch period associated with a pitch of the second packet, according to the adjusted length of the first packet and an arrival time of a third packet received after the second packet.

27. A method of processing a sequence of audio samples, each of said samples being stored within a respective packet, said method comprising:
   retrieving a first packet form an input buffer;
   determining a pitch within said audio samples for said retrieved packet;
   determining whether a second packet of said audio samples has arrived at said input buffer, said second packet having an expected arrival time;
   in response to a determination that the second packet arrives after the expected arrival time, adjusting a play time for said retrieved packet using at least one pitch period associated with said pitch based on an actual arrival time of the second packet; and
   adjusting a play time for said second packet, using at least one pitch period associated with a pitch of the second packet, based on the adjusted play time of the first packet and an actual arrival time of a third packet.

28. The method of claim 27, further comprising: determining an estimated time of arrival (ETA) for the second packet.

29. The method of claim 28, wherein said play time of said first packet is a target playtime.

30. The method of claim 29, wherein said target play time includes the ETA of the second packet and a latency period.

31. The method of claim 30 further comprising:
   expanding the play time of said retrieved packet when the second packet arrives during the latency period.

32. The method of claim 31, wherein the play time of the retrieved packet is expanded by copying pitch periods contained within said retrieved packet.

33. The method of claim 29 further comprising: reducing the play time of the second packet when the third packet arrives before an ETA of the third packet.

34. The method of claim 33, wherein the play time of the second packet is reduced by removing a pitch period within the second packet.

35. The method of claim 34, wherein the step of reducing is implemented to compensate for the step of expanding.

* * * * *